April 11, 1944.   F. A. NIEMANN   2,346,601
CALCULATING MACHINE
Filed Feb. 24, 1941   8 Sheets-Sheet 1

INVENTOR.
Frederick A. Niemann
BY
Sheridan, Davis & Cargill
Attys

April 11, 1944.   F. A. NIEMANN   2,346,601
CALCULATING MACHINE
Filed Feb. 24, 1941   8 Sheets-Sheet 2

INVENTOR.
Frederick A. Niemann
BY Sheridan, Davis & Cargill
Attys

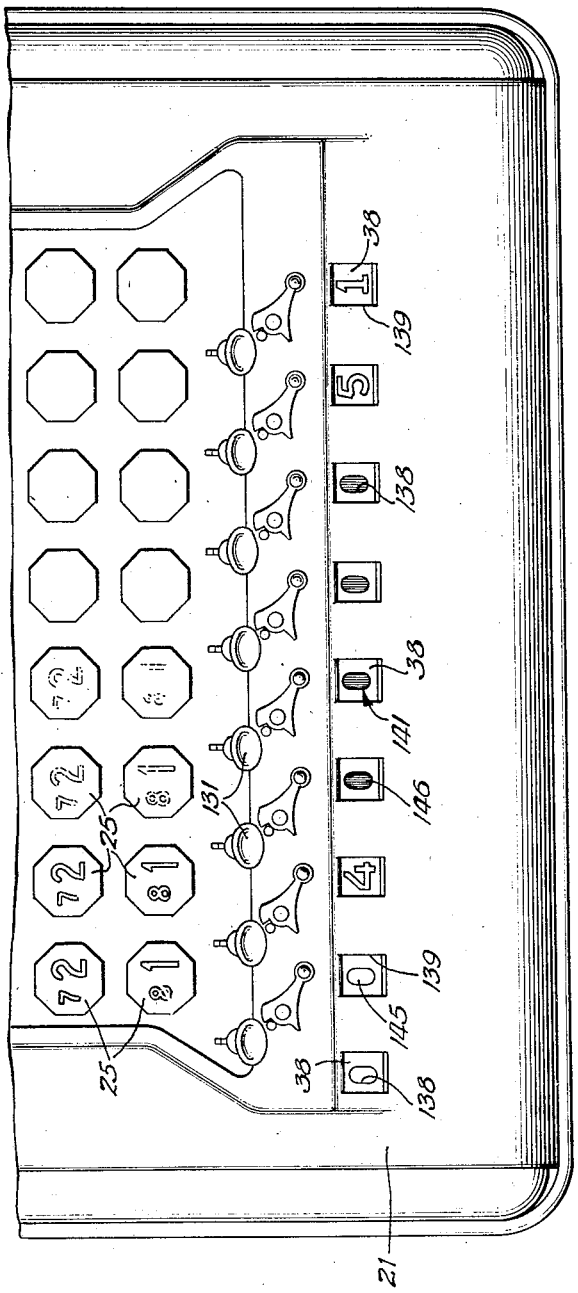

April 11, 1944.　　　F. A. NIEMANN　　　2,346,601
CALCULATING MACHINE
Filed Feb. 24, 1941　　　8 Sheets-Sheet 4
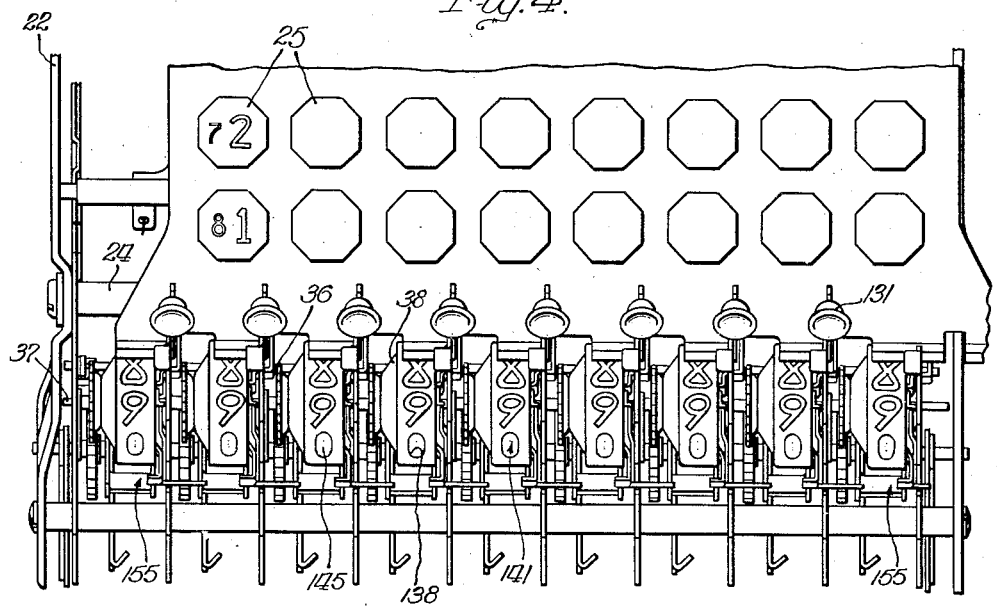
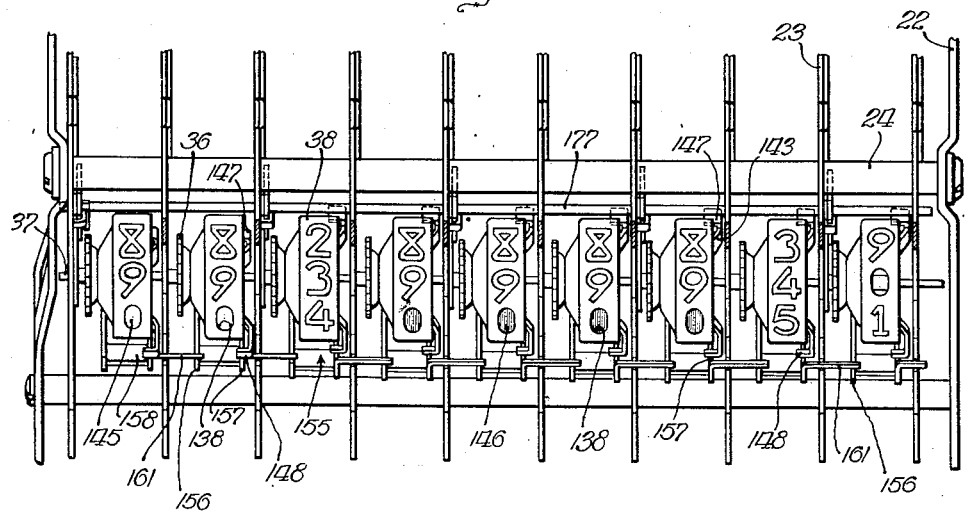
INVENTOR.
Frederick A. Niemann
BY Sheridan, Lewis & Cargill
Attys

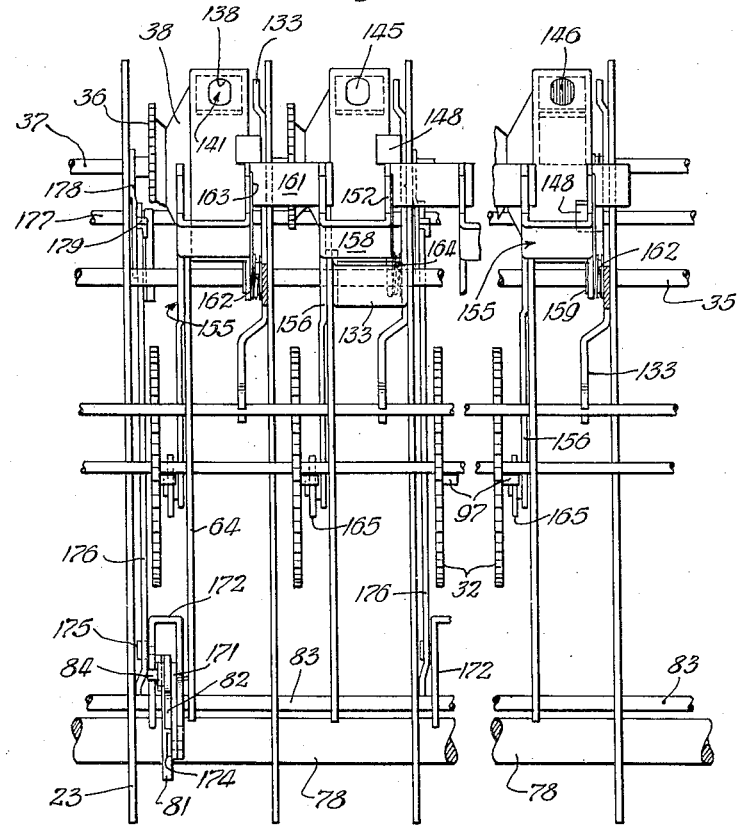

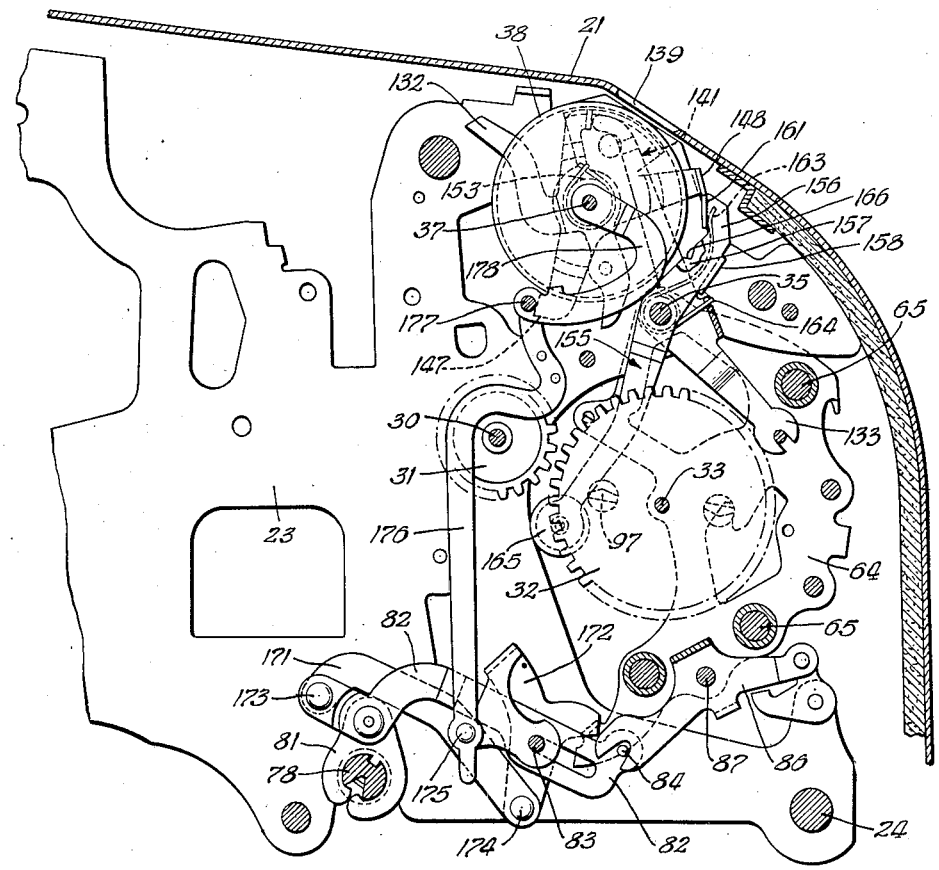

April 11, 1944.   F. A. NIEMANN   2,346,601
CALCULATING MACHINE
Filed Feb. 24, 1941   8 Sheets-Sheet 7

INVENTOR.
Frederick A. Niemann
BY Sheridan, Davis + Cargill
Attys

April 11, 1944. F. A. NIEMANN 2,346,601
CALCULATING MACHINE
Filed Feb. 24, 1941 8 Sheets-Sheet 8
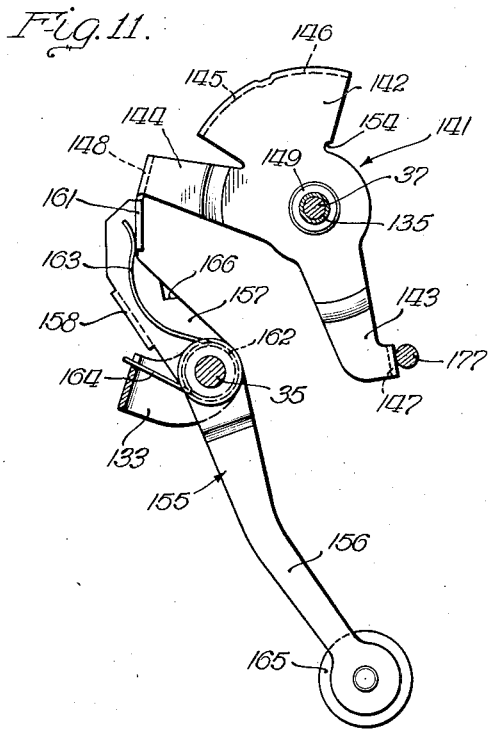
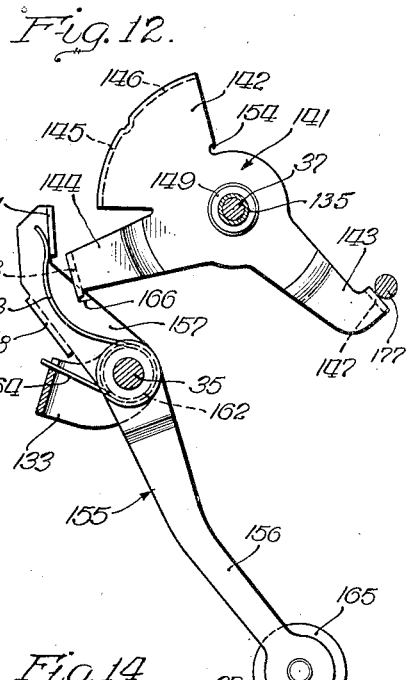
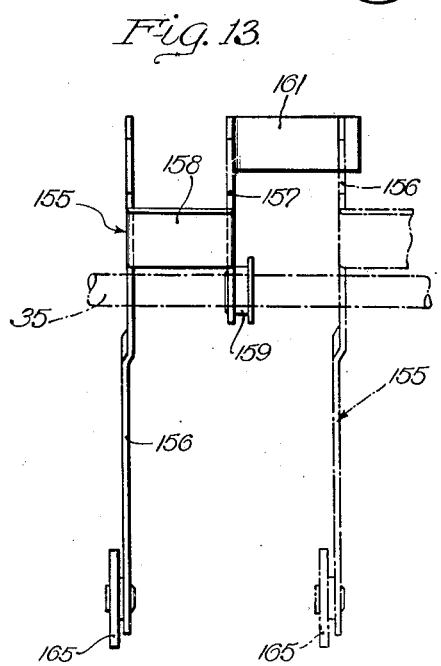
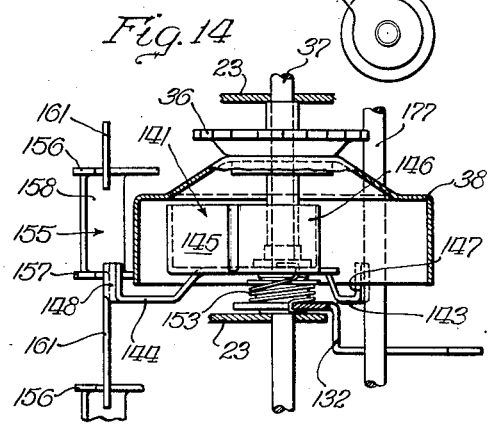
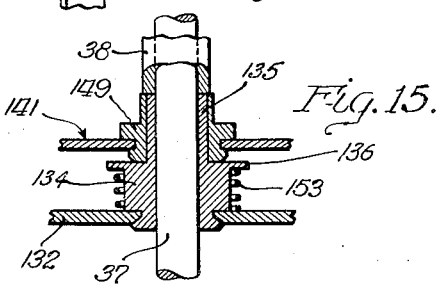
INVENTOR.
Frederick A. Niemann
BY
Sheridan, Davis & Cargill
Attys Patented Apr. 11, 1944

2,346,601

UNITED STATES PATENT OFFICE 2,346,601

CALCULATING MACHINE

Frederick A. Niemann, Chicago, Ill., assignor to Felt & Tarrant Manufacturing Company, Chicago, Ill., a corporation of Illinois Application February 24, 1941, Serial No. 380,176

9 Claims. (Cl. 235—61)

This invention relates to calculating machines and has for a primary object to minimize, if not to prevent, errors in the reading of the answers or results registered by the numeral or other indicia-bearing or registering means of such machines.

To that end the invention comprehends the provision in such calculating machines of means for visually distinguishing the denominational order or orders which should be read as a part of any registered answer or result from the denominational order or orders which should not be read as a part of such answer or result.

Another object of the invention is to construct and arrange in such a calculating machine significant-digit indicating means which in the presently preferred embodiment of the invention renders visible only numerical indicia including ciphers which are significant in a registered answer resulting from positive calculation without rendering visible even cipher indicia in other denominational orders of the machine.

A further object of the invention is to provide significant-digit indicators and to associate one such indicator with the numeral wheel or other indicia-bearing member of each denominational order of the calculating machine and so to construct and arrange those indicators that upon the operation of any numeral wheel to register a digital value, the significant-digit indicators associated with that numeral wheel and every other numeral wheel of lower denominational order are automatically moved into indicating positions and remain in such positions until a zeroizing operation clears the register.

The invention has as another object the provision of means for latching each significant-digit indicator in its indicating position when it is moved thereto.

A further object of the invention is the provision of means for automatically returning the significant-digit indicators to their initial or blanking positions upon the operation of the zeroizing means.

Another object of the invention is so to construct and arrange the significant-digit indicators that they cooperate with the respective numeral wheels to blank the register upon the operation of the zeroizing means and to register cipher indicia in the appropriate denominational orders of a registered answer or result whenever such answer or result includes one or more ciphers without registering cipher indicia in any other denominational order.

Other objects and advantages of the invention will become apparent as it is better understood from the following description which when taken in connection with the accompanying drawings discloses a preferred embodiment thereof.

In the drawings—

Figure 3 is a top plan view of the front end of the machine of Figure 1 with only the numerical indicia which are significant in the registered number visible;

Figure 4 is a view similar to Figure 3 with the casing of the machine removed and with all significant-digit indicators in blanking position;

Figure 5 is a view similar to Figure 4 with additional parts omitted and with the numeral wheels and associated significant-digit indicators in the same positions, respectively, as illustrated in Figure 3;

Figure 6 is a front elevational view of some of the denominational orders of the accumulator mechanism of Figure 5 with parts omitted for convenience of illustration;

Figure 7 is a side elevation of the forward portion of the calculating machine looking from the side thereof opposite that of Figures 1 and 2 with a part of the casing in cross section and showing the accumulator in cleared position and the significant-digit indicating means in blanking position.

Figures 11 and 12 are detailed elevations partly in cross section of a significant-digit indicator and its associated latching lever in blanking and indicating positions, respectively;

Figure 13 is a detailed front elevation of the latching lever of Figures 11 and 12 and shows it in cooperative relationship with an adjacent latching lever shown in broken lines;

Figure 14 is a fragmentary detailed plan view, partially in cross section, of the significant-digit indicator shown in Figures 11 and 12; and Figure 15 is a fragmentary detailed cross section taken axially through the hub portion of a numeral wheel and significant-digit indicator assembly.

Figure 1:
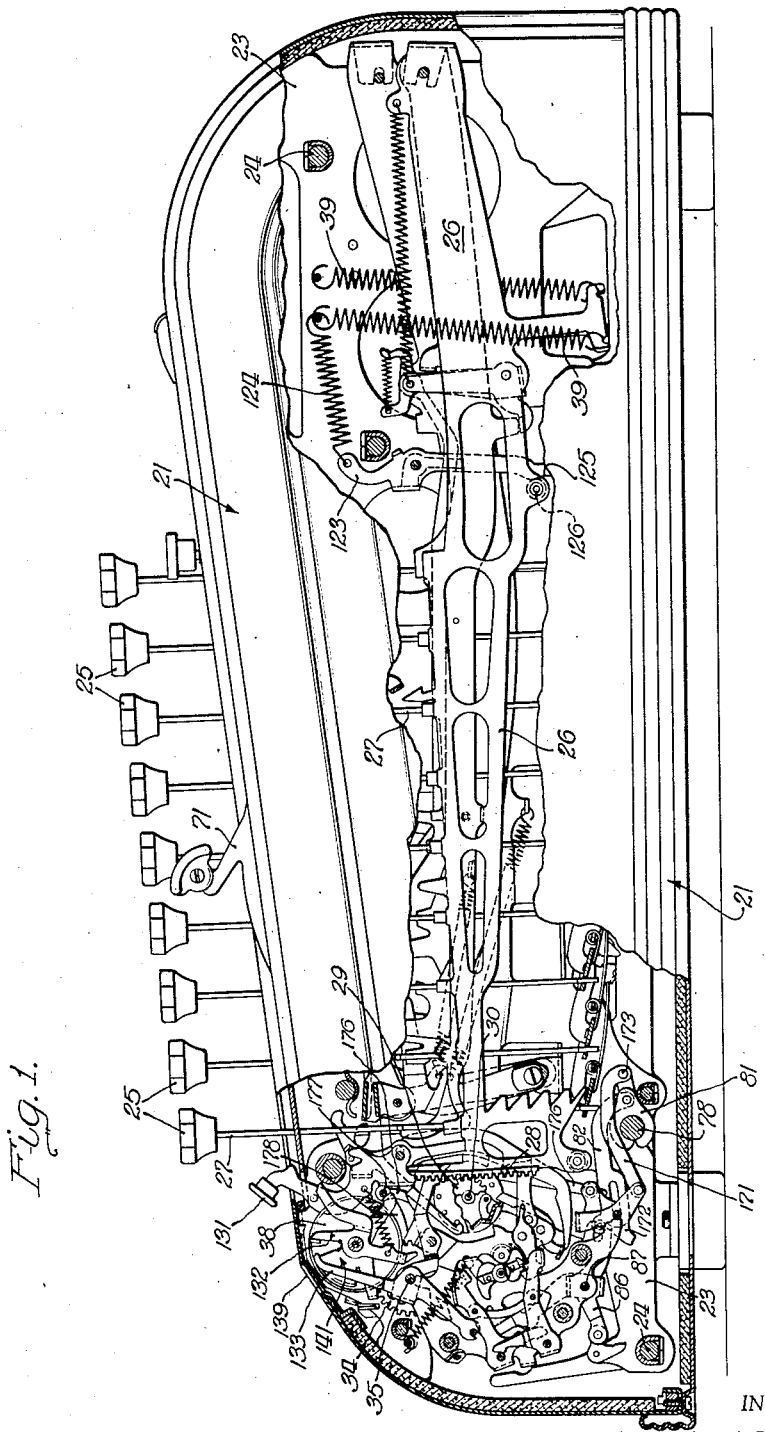
Figure 1 is a side elevational view of a calculating machine embodying the features of the invention, parts of the machine being broken away or otherwise removed and parts being shown in cross section to assist in understanding the machine.

The invention, for illustrative purposes, is disclosed as being embodied in a key-actuated multiple order calculating machine of the type known in the art as the "Comptometer," although the invention is not limited or restricted thereto. The details of construction of that type of calculating machine are disclosed in United States Letters Patent No. 767,107 and No. 960,528 to Dorr E. Felt, dated August 9, 1904, and June 7, 1910, respectively, and No. 1,357,748 to Joseph A. V. Turck, dated November 2, 1920, and in my copending application for United States Letters Patent, Serial No. 358,222, filed September 25, 1940 (Pat. No. 2,278,183, dated March 31, 1942). The style and construction of the machine casing is that of my co-pending application for United States Letters Patent, Serial No. 232,782, filed October 1, 1938 (Pat. No. 2,278,405, dated March 31, 1942). The detailed disclosure of that machine will not therefore be repeated herein. Instead only so much thereof as will aid in an understanding of the invention as illustrated will be described herein, and reference is hereby made to such patents and patent applications for a full and complete description of the illustrated calculating machine.

As disclosed in the above mentioned Patent No. 1,357,748, the illustrated actuating, accumulating, and zeroizing or clearing means are supported in a casing 21 by a suitable frame. That frame comprises side skeleton plates 22, spaced intermediate skeleton plates 23, and transverse tie-rods 24 suitably securing the plates 22 and 23 together in spaced relation. For convenience the same reference characters will be employed hereinafter as are employed in that patent to designate the devices supported on that frame.

It will be understood by those skilled in this art that in such a multiple order machine a plurality of keys 25 are arranged in a suitable number of columns or rows, for example, 8 columns of 9 keys each. The keys of each column preferably bear the ordinal numerals of 1 to 9. They are adapted to actuate the accumulating apparatus through the agency of their depending stems 27 and a plurality of key operable column actuators or pivoted segment levers 26, one of which is provided for each column of keys. For that purpose each column actuator 26, after operation by one of the associated keys 25, is movable upwardly from its depressed position by suitable springs 39. At the forward oscillatable end each column actuator is provided with a rack 28 which meshes with an accumulator pinion 29 loosely mounted for rotation on a transverse shaft 30 suitably journaled in the skeleton frame.

In addition to the accumulator pinion 29 the accumulator means for each denominational order of the machine, or for each column of keys 25, includes a transmitting pinion or gear 31 rotatable on the shaft 30, a pawl and ratchet mechanism (not shown) for drivingly connecting the accumulator pinion 29 with the transmitting gear 31 when the former is rotated during the up stroke of the column actuator 26, a carrying gear 32 rotatable on a transverse shaft 33 and adapted to mesh with the transmitting gear 31, an intermediate gear 34 rotatable on a transverse shaft 35 and in mesh with the carrying gear 32, a numeral wheel gear 36 rotatable on a transverse shaft 37 and in mesh with the intermediate gear 34, and a numeral wheel 38 fixed to the numeral wheel gear 36 for rotation therewith on the shaft 37. The numeral wheels 38 are of hollow construction and the peripheral flange of each bears the ordinal numerals of 1 to 9. The shafts 30, 35, and 37 are suitably supported by the skeleton frame in fixed relation with one another and the shaft 33 is carried in a swinging frame including spaced partition plates 64 and connecting tie-rods 65. The swinging frame carrying the shaft 33 is mounted for limited pivotal movement of the relatively fixed shaft 35 to permit movement of the carrying gears 32 from meshing relationship with the respective transmitting gears 31 in zeroizing or clearing the register.

During downward movement of any column actuator the pawl and ratchet between the accumulator gear 29 and the transmitting gear 31 have relative movement, or are slidably related, and hence no motion is transmitted to the gear train including the transmitting, carrying, intermediate, and numeral wheel gears. During the return or up stroke of any column actuator, however, the pawl and ratchet between the accumulator gear 29 and the transmitting gear 31 are drivingly related and hence the numeral wheel associated with that column actuator is rotated sufficiently to indicate an amount determined by the digital value of the key 25 which was employed to depress the column actuator.

Figure 2:
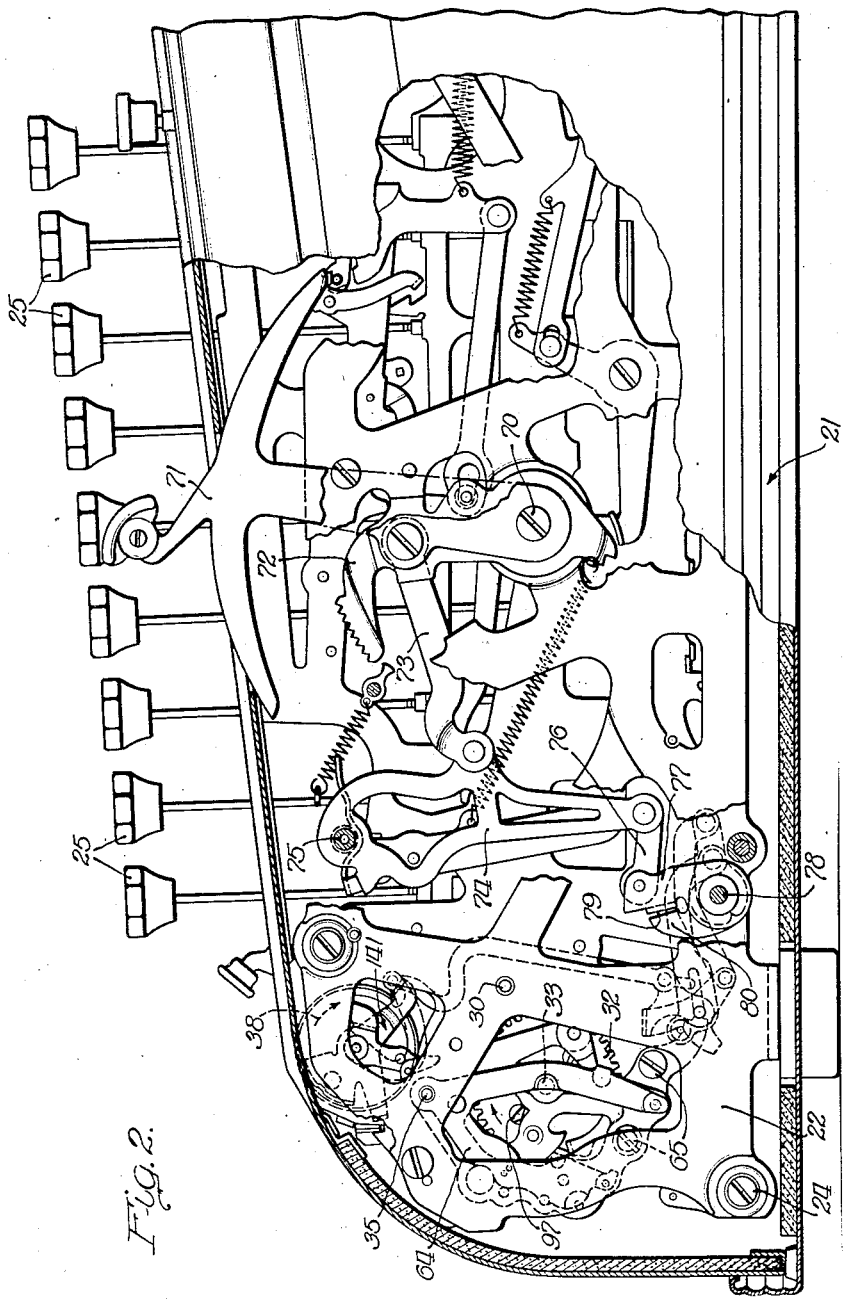
Figure 2 is a fragmentary side elevational view of the calculating machine of Figure 1 with parts broken away or otherwise removed to show the zeroizing means.

In the illustrated machine the means employed for the zeroizing or clearing of the numeral wheels 38 comprises, as will be understood by the foregoing reference to Patent No. 1,357,748, a spring associated with each carrying gear 32 and wound thereby during calculation. When the swinging frame is swung about the shaft 35 in a direction to move the carrying gears from meshing relationship with the transmitting gears 31, the springs, by rotating the carrying gears, the intermediate gears, and the numeral wheel gears, will return every previously operated numeral wheel 38 to its zero position. For controlling the movement of the carrying gears from meshing relationship with the transmitting gears, a zeroizing lever or operating handle 71 secured on a short transverse shaft 70, journaled in the right frame plate 22, is adapted to impart limited rotating movement in a counter-clockwise (Figure 2) direction to a transverse shaft 78 by a series of pivotally connected members. That series of pivotally connected members consists of a segment 72 secured on the shaft 70, a link 73, a depending lever 74 pivoted as at 75 to the machine frame, a short link 76, an arm 77 rotatably mounted on the transverse shaft 78 and having a shoulder 79, and an arm 80 fixed on the shaft 78 and engageable by the shoulder 79 when the zeroizing lever is moved to the left as viewed in Figure 2 to rotate the shaft 78.

The counter-clockwise (Figure 2) movement of the shaft 78 is transmitted to the swinging frame by rocker arms 81 (Figure 7), one rocker arm 81 being provided for every second or alternate denominational order of the machine, curved links 82, each pivotally connected at one end with one of the rocker arms 81 and having at its other end an elongated aperture through which a transverse shaft 83 extends and each provided at such other or forward end with a pin 84, and toggle members 86, each having a bifurcated rear end providing spaced jaws at opposite sides of each pin 84. The toggle members 86 are pivotally mounted on a shaft 87 extending through and carried by the swinging frame members 64.

Thus the limited rotation of the shaft 78 in a counter-clockwise direction when the zeroizing lever 71 is moved to the left (Figure 2) results in a forward and downward movement of the pins 84 which, by engagement with the bifurcated ends of the toggle members 86, swing the shaft 87 and swinging frame forwardly about the shaft 35 to move the carrying gears 32 out of mesh with the transmitting gears 31. In this position the springs hereinabove referred to operate the carrying, intermediate, and numeral wheel gears to return any previously operated numeral wheels to their initial or zero positions. They are stopped in such positions by stop arms which are projected into the path of either of a pair of diametrically positioned zero stop pins 97 (Figures 2, and 6 to 8) on each carrying gear 32 by the above described apparauts for moving the carrying gears out of mesh with the transmitting gears 31.

The reading of results or answers registered in a multiple order calculating machine has hitherto been an ever present source of error. For example, in only an 8-column machine, after a number of adding operations have been performed, it is unlikely that even an experienced operator can remember the number of digits in the largest number entered, or can closely approximate the number of digits in the sum. Consequently, operators are liable not to look far enough to the left of the units order when scanning the register or accumulator apparatus for the result. They may not and sometimes therefore do not see the first or leftmost digit or digits, or a digit of the highest denominational order in the sum. That is particularly true where the result includes a number of ciphers because such scanning normally progresses from right to left and after several ciphers have been observed during scanning the natural tendency is to look no further.

The probability of such errors is minimized and the objects of the invention are attained by the provision of means for visually distinguishing the denominational order or orders of the machine significant in, and therefore to be read as a part of, any answer or result registered in the machine, from every other denominational order of the machine. When all of the numeral wheels are in the initial or zeroized position, such means so blanks the register that even the zeros or cipher indices which are usually visible under such condition are not registered or visible. Thus in the illustrated machine, when that occurs not only the ordinal numerals of 1 to 9 but also the cipher indices of each numeral wheel are invisible. When, however, one or more of the numeral wheels are actuated as already described, the numerical indicia in the registered answer or result are indicated as being significant by the novel means which under such condition renders visible the numerical indicium of each denominational order which should be read as a part of the result or as the case may be, the numerical indicia of any actuated numeral wheel and all others to the right thereof without rendering visible the numerical indicia of any numeral wheel to the left of the actuated numeral wheel. If such answer or result includes one or more ciphers, a cipher indice is registered for each and in the proper denominational order of the registered answer or result.

Illustrative of the invention, each numeral wheel 38, as shown in Figures 3 and 4 to 6, as already explained is provided with the ordinal numerals, 1 to 9. Instead of the usual cipher, a cipher-shaped aperture 138 is provided in the peripheral flange of each numeral wheel. When the numeral wheels are in their cleared or zero position the cipher-shaped apertures 138 respectively register with usual sight apertures 139 provided in the forward part of the casing 21. Mounted on the numeral wheel shaft 37 interiorly of each numeral wheel 38 is an indicator device designated generally by the reference character 141. Each indicator device 141, as shown in Figures 11, 13 and 14, is stamped or otherwise provided with three radially extending portions called respectively a sector or significant-digit indicator 142, a resetting arm 143, and a latching arm 144.

The sector 142 has an arcuate lateral flange divided into a blanking portion 145 and a visual indicating portion 146. The blanking portion 145 of each sector 142 is given a color preferably the same as that of the peripheral faces of the numeral wheels 38, and the visual indicating portion 146 is given a bright distinctive color, for example, red, to indicate or register a blank and a cipher indice, respectively, when in registration or coincidence with the cipher-shaped aperture 138 of the corresponding numeral wheel.

The resetting arm 143 of each indicator device 141 is substantially oppositely disposed with respect to the sector 142 and is offset in the opposite direction from the flange portions 145 and 146 (Figure 14) sufficiently to bring its outer end outside and beyond the peripheral face of the numeral wheel. The outer end of each resetting arm 143 is provided with a lateral flange or shoulder 147. The latching arm 144 of each indicator device 141 is between the sector 142 and the resetting arm 143, as shown in Figures 11, 12 and 14, and is provided at its outer end with a lateral flange or shoulder 148.

As illustrated in Figures 1, 2, 3, 14, and 15, the indicator devices 141 are adapted for assembly in a calculating machine embodying the novel carry cut-out mechanism which, as fully disclosed in my co-pending application for United States Letters Patent, Serial No. 358,222, filed September 25, 1940 (Pat. No. 2,278,183, dated March 31, 1942), is employed in subtracting operations of the machine. Since such carry cut-out mechanism per se forms no part of the present invention and is fully disclosed in my patent application just referred to, only so much thereof as will aid in understanding the assembly of the illustrated embodiment of the invention in such a calculating machine will be referred to herein.

Figure 8:
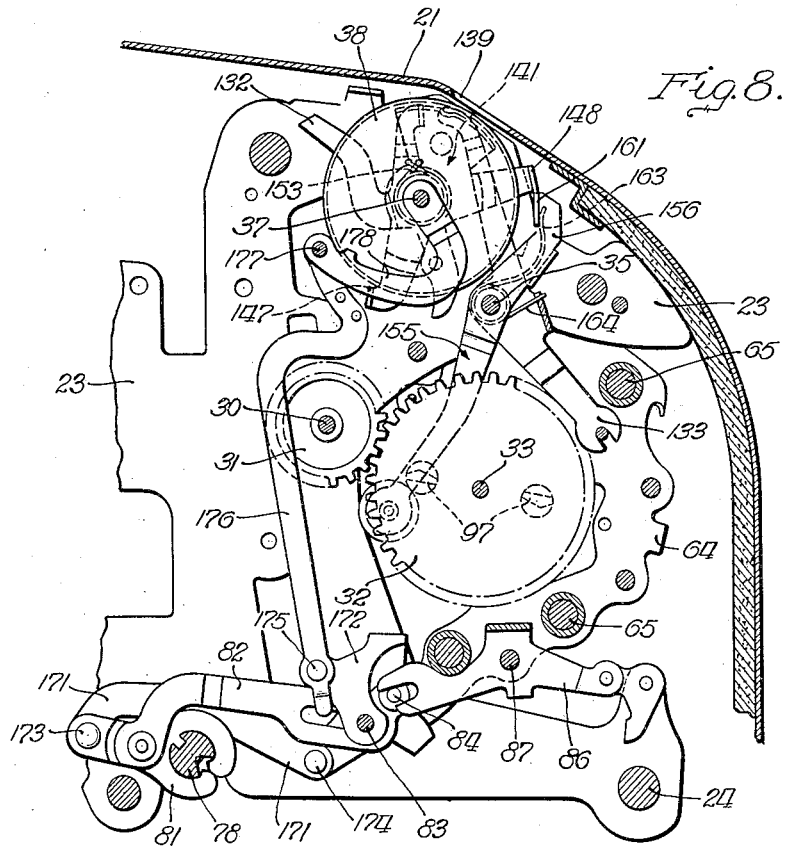
Figure 8 is like Figure 7 but shows an intermediate position assumed by parts of the accumulator during a zeroizing or clearing operation, and the significant-digit indicating means in blanking position.

The carry cut-out mechanism includes for each denominational order of the machine a carry cut-out lever 131, a latch lever 132 for the carry cut-out lever, and a latch releasing and blocking lever 133. As shown in Figures 8 and 15, each of the latch levers 132 is provided with a hollow hub member 134 which is rotatably mounted on the numeral wheel shaft 37 and which has a reduced end portion 135 extending from adjacent the hub of the numeral wheel to a flange 136 intermediate the ends of the hub member.

Each indicator device 141 is provided with a circular aperture centrally thereof in which a hub member 149 is suitably secured. The hub member 149 of each indicator device is rotatably mounted on the reduced end portion 135 of the hub member 134. A coil spring 153 is arranged about the hub member 134 between the latch lever 132 and the flange 136, and has one end suitably secured to an arm of the latch lever 132 and its other end extending over the flange 136 and engaging in a recess 154 in the rear side of the sector 142, as shown in Figures 11 and 12. The spring 153 normally urges the associated indicator device 141 in a counter-clockwise direction as viewed in Figures 11, 12, and 14 about the numeral wheel shaft 37.

When so assembled, the sector 142 of each indicator device 141 is inside one of the numeral wheels 38 with the contiguous blanking flange portion 145 and the visual indicating flange portion 146 co-axial with and spaced slightly inwardly of the peripheral flange of the numeral wheel. Normally, when the numeral wheels are in cleared or zeroized position, as shown in Figures 4, 7, 8 and 11, the blanking flange portion 145 of each indicator device is disposed in a blanking position, or in registration or coincidence with the cipher-shaped aperture 138 in the associated numeral wheel and with the associated sight aperture 139 in the casing 21. In accordance with conventional drawing practice the outlines of the cipher-shaped apertures 138 are clearly shown in the drawings. The drawings therefore ostensibly indicate that the outline of every registered aperture 138 is clearly visible even when the associated indicator device 141 is in its blanking position. In that respect the drawings exaggerate actual conditions in the calculating machine which are determined by the thin peripheral flanges of the numeral wheels, the proximity of each blanking flange portion 145 to the peripheral flange of the associated numeral wheel, and the fact that the same color is employed for the peripheral flanges of the numeral wheels and the blanking flange portions 145. Since the blanking flange portion 145 is the same color as the peripheral face of the numeral wheel 38, the numerical indicia including the cipher of each numeral wheel are invisible through the sight aperture 139 when the indicator device 141 is in its blanking position.

Each indicator device 141 is movable by the spring 153 about the numeral wheel shaft 37 from the blanking position to an indicating position at which the visual indicating flange portion 146 is in registration or coincidence with the corresponding sight aperture 139 in the casing. In that indicating position (Figure 12) of any indicator device 141, if the associated numeral wheel 38 remains in its zero position or is moved thereto during the calculating operation, the distinctive color of that visual indicating flange portion 146 cooperates with the cipher-shaped aperture 138 to define and register a cipher indice and render it visible through the sight aperture 139.

The indicator devices 141 are normally latched against the action of their springs 153 by latch levers 155, one such latch lever being provided for each indicator device 141. The springs 153 and the latch levers 155 are included in means for automatically moving any indicator device 141 from its blanking position to its indicating position whenever the associated numeral wheel is actuated either by operation of any key 25 of the corresponding column or denominational order, or by a carrying operation from the next lower order.

As shown in Figures 7 and 8 and 11 to 13, each latch lever 155 comprises a relatively long arm 156, a shorter arm 157 laterally spaced from and parallel with an end of the long arm 156, and a connecting transverse portion 158, and is pivotally mounted on the transverse shaft 35 which extends through a hub member 159 at the lower end of the short arm 157 and through an aperture in the long arm 156 intermediate its ends. At its upper end the short arm 157 is provided with a laterally extending arm portion or other operating member 161 engageable with the rear side of the long arm 156 of the next latch lever 155 to the right, or the latch lever 155 associated with the next lower denominational order of the machine for a purpose presently to be described hereinafter. A coil spring 162 is arranged about the hub member 159 of each latch lever 155, one end 163 of the spring extending upwardly and bearing against the forward surface of the operating member 161 (Figures 11 and 12), and the other end 164 of the spring extending forwardly and bearing against the upper surface of the transverse portion of the carry cut-out latch releasing lever 133 associated with that order. With such an arrangement the springs 162 urge their respective latch levers 155 rearwardly of the machine toward releasable latching relationship with the latching arms 144 of the respective indicator devices 141. That direction is counter-clockwise, as viewed in Figures 7 and 8, and clockwise as viewed in Figures 11 and 12.

The lower end of the long arm 156 of each latch lever 155 has rotatably secured thereto by any suitable means a dolly roll 165 which, when the latch lever is in its latching position, extends into the path of movement of the zero stop pins 97 on the associated carrying gear 32, as shown in Figures 7 and 8. When in latching position the lateral flange 148 of the latching arm 144 of each indicator device 141 rests upon the upper end of the short arm 157 and the arm portion 161 of the associated latch lever 155 whereby releasably to latch the sector 142 in its blanking position (see Figures 4, 7, 8 and 11 and the two left orders of Figures 5 and 6).

As soon as any value is entered in any order of the accumulator, an increment of rotation in a counter-clockwise direction, as viewed in Figure 7, is imparted to the carrying gear 32 of that order. Any such rotation of one of the carrying gears 32 will move one of its zero stop pins 97 into engagement with the dolly roll 165 on the associated latch lever 155 and thereby will move the lower end of that latch lever in a clockwise direction, as viewed in Figures 7 and 8, against the action of its spring 162. Such movement of the latch lever 155 is from the position shown in Figures 7 and 8 to that shown in Figure 12, or counter-clockwise from its position in Figure 11 to its position in Figure 12. Thus the upper end of any latch lever 155 is moved sufficiently to move its arm 157 and operating member 161 out of supporting engagement with the latching arm 144 of the associated indicator device 141. That indicator device 141 is thereupon released when any value is entered in the order of the machine with which it is associated.

When so released the spring 153 rotates the indicator device 141 to move the sector 142 from blanking to indicating position. The short arm 157 of each latch lever 155 is provided with a latching notch 166 (Figures 11 and 12) in which the flange 148 of the latching arm 144 engages to prevent further rotation of the indicator device in the same direction when the sector is thus moved to its indicating position.

The operating members 161, with the springs 153 for operating the indicator devices 141, constitute means for automatically moving all of the indicator devices 141 of all lower denominational orders to indicating position whenever one indicator device is so moved as described above. As shown in Figures 4 to 6 and 14, the laterally extending operating member 161 of each latch lever 155 is engageable with the rear side of the long arm 156 of the next latch lever 155 to the right as viewed from the front of the machine. During forward movement of the upper end of any one of the latch levers 155 its laterally extending operating member 161 will move forwardly to move in the same direction the upper end of the next latch lever 155 to the right. That next latch lever to the right, in turn, through its laterally extending operating member 161, will similarly move the upper end of the latch lever 155 next to the right of it and so on for all latch levers to the right of the first mentioned latch lever whereupon to release the respectively associated indicator devices 141 for movement to indicating position. Thus forward movement of the upper end of any latch lever 155 will result in all latch levers 155 to the right thereof, as viewed from the front of the machine, or all those associated with lower denominational orders being swung to release the respectively associated indicator devices 141 for movement to indicating position.

The result of the above described operations is best illustrated in Figures 3, 4, 5 and 6. Referring particularly to Figure 3, it will be seen that a "4" has been entered in the seventh order of the accumulator and is visible through the appropriate sight aperture 139. When the entry was made in the seventh order the indicator device 141 of that order, and all of the indicator devices to the right thereof, or in lower orders, were moved from their blanking to their indicating positions. Consequently, in all of these orders to the right of the seventh, excepting those wherein a value has been subsequently entered, as illustrated in the second and first orders, the bright or distinctively colored indicating flange portions 146 of the sectors 142 are respectively in registration or coincidence with the cipher shaped apertures 138 and the associated sight openings 139. All of the numerical indicia, including ciphers which are significant in the registered answer or result, are thus rendered visible.

When the ciphers are thus registered or rendered visible, they are indicated as being significant in the registered answer or result. Their distinctive color visibly indicates that in reading such an answer or result a digital value may be expected in a higher denominational order. Hence accurate reading of the result registered in the accumulator is promoted and errors in reading are minimized by the novel indicating means. In other words, as the operator reads the value shown in Figure 3 as entered in the accumulator, proceeding from right to left as is customary, he will not stop and assume the result to be "51" upon observing the first, second, or third cipher indice, but instead will look farther to the left because the distinctively colored ciphers in the third to the sixth orders, inclusive, will indicate the presence of a digital value in a higher order in the accumulator. Upon reaching the eighth denominational order, however, the operator will be immediately informed that no further values have been entered as a part of, or are significant in, the result, since the sector 142 of that order is in its blanking position.

Means are provided for automatically returning all of the sectors 142 from their indicating positions to their blanking positions whenever a zeroizing operation is performed. As has been described hereinbefore, zeroizing of the numeral wheels 38 is accomplished by rocking the shaft 78 to move the swinging frame plates 64 forwardly from their positions in Figure 2 to their positions in Figure 7. Such means includes a plurality of links 171, and an equal number of three-armed bell crank levers 172. Each link 171 is pivotally connected at its rear end as at 173 to a rearward extension of one of the links 82, and is pivotally connected at its forward end as at 174 to the lower arm of one of the levers 172.

Figures 9, 10:
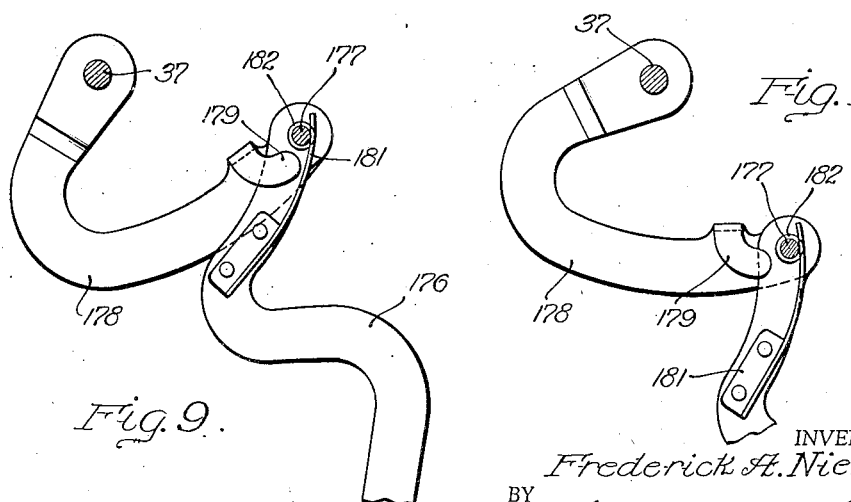
Figures 9 and 10 are fragmentary cross sections of the resetting mechanism for the significant-digit indicating means and show detailed elevations of the upper part of such mechanism in different positions of operation.

As shown in Figure 6, each lever 172 is so shaped and arranged as to straddle one of the links 82 and one of the links 171, and is pivotally secured at opposite sides thereof on the transverse shaft 83. The rearwardly extending arm of each lever 172 is pivotally connected at 175 to an upwardly extending link 176. The upper end of each of the links 176 is pivotally mounted on a transverse rod 177 which extends across the machine through suitable apertures in the skeleton frame plates 23 adjacent and behind the numeral wheels 38, and in operative relationship with the flanges 147 of the resetting arms 143 of the several indicator devices 141. As will be seen in Figures 7 and 8, the links 176 are curved adjacent their upper ends to prevent interference with other parts of the machine, such as the shaft 30. The rod 177 is swingably suspended from the numeral wheel shaft 37 by curved levers 178 which are pivotally connected at their lower ends to the rod 177 and which are rotatably mounted at their upper ends on the shaft 37 adjacent alternate skeleton frame plates 23. Each lever 178, as shown in Figures 6, 9, and 10, is provided with an ear 179 which is bent or otherwise formed laterally, and then downwardly in parallel relationship to the main body of the lever 178, and is disposed at the side of the associated link 176 opposite the main body portion of the lever 178. Each link 176 and its associated lever 178 are thus maintained in proper lateral relationship to each other. The links 176 are also maintained in proper laterally spaced relationship on the rod 177. This is accomplished by a spring member 181 secured at one end in any suitable manner to the sides of each link 176 opposite the associated lever 178, and spaced notches or peripheral grooves 182 provided in the rod 177, the unattached end of each spring member 181 engaging in one of the grooves 182.

Thus rocking of the shaft 78 in a zeroizing operation will move the links 171 forwardly from the position of Figure 1 to the position of Figure 7. In so moving the links 171 rotate the bell crank levers 172 about the shaft 83 as a pivot in a counter-clockwise direction, thus pulling the links 176 downwardly to swing the rod 177 and the levers 178 forwardly from their positions of Figure 1 to their positions of Figure 7, such movement of the rod 177 being on an arc concentric with the numeral wheel shaft 37. Consequently, all of the indicator devices 141 which previously have been moved to indicating position are returned to blanking position by the rod 177 which, during the movement thereof from the position of Figure 1 to the position of Figure 7, engages and moves the flanges 147 of the respective resetting arms 143 in a clockwise direction, as viewed in Figures 11 and 12. Such rotation of the indicator devices 141 permits the springs 162 to swing the associated latch levers 155 from the actuated position of Figures 1 and 12 to the normal positions of Figures 7 and 11 releasably to latch and maintain the indicator devices in blanking position until the subsequent entry of a value in the accumulator.

After a zeroizing operation the several parts assume the positions shown in Figure 7. Subsequent operation of any one of the digital keys 25 will cause the return of the swinging frame from this cleared position and such return will be effected at the completion of the down stroke of the actuated key 25. At this point in the operation of the key, however, no rotation will have been imparted to the associated gear train and numeral wheel, as has previously been explained, so that the zero stop pins 97 on the associated carrying gear 32 will still be in the position of Figure 7. At this intermediate station in the operation of the machine Figure 8 shows the positions of the several parts. As therein shown the rod 177 has been returned upwardly and rearwardly to its normal or inoperative position. The indicator devices 141, however, are latched in their blanking positions by their associated latch levers 155. Figure 12 shows the positions of the indicator device 141 upon the following up stroke of the actuated key 25. As already explained, during the up stroke of the actuated key the associated gear 32 and zero stop pins 97 are moved to swing the latch lever 155 and to release the associated indicator device 141, and the indicator devices in all lower denominational orders.

It is thought that the invention and many of its attendant advantages will be understood from the foregoing description, and it will be apparent that various changes may be made in the form, construction and arrangement of the parts without sacrificing all of its material advantages, the form hereinbefore described being merely illustrative of a presently preferred embodiment thereof. What is claimed as new and desired to be secured by Letters Patent of the United States is:

1. In a calculator with denominational orders of wheels for registering the ordinal numerals of 1 to 9, inclusive, each said wheel having an aperture therein at the position normally occupied by a cipher, means for visually distinguishing between every denominational order to the left of the left-most wheel actuated in the calculation of any registered result and every other denominational order of the calculator, comprising a significant-digit indicator operating internally of each said wheel and having a blanking position and a cipher indicating position for variably registering through the aperture in the corresponding wheel a blank when said significant-digit indicator is at blanking position and a cipher when it is in cipher indicating position, and means for governing the variation of registering by each significant-digit indicator, depending upon whether it is to the right or to the left of said left-most wheel.

2. In a register including several denominational orders of numeral bearing members, each having the numerals 1 to 9, inclusive, thereon and an aperture therein at the position normally occupied by a cipher, a sector back of each said aperture, each said sector having a normal blanking position where said sector will display a blank through the corresponding aperture, and having a cipher indicating position relative to said aperture, and means for shifting the sectors to cipher indicating position relative to said aperture in the denominational order in which a numeral bearing member is actuated and in all denominational orders lower than said actuated numeral bearing member.

3. The combination of a register including several denominational orders of numeral bearing members, each having the numerals 1 to 9, inclusive, thereon and an aperture therein instead of the usual cipher, with actuating mechanism for said register a sector back of each said aperture, each said sector having a normal blanking position at which said sector will display a blank through the corresponding aperture and having an indicating position relative to said aperture to register a cipher, and means controlled by said actuating mechanism for shifting to indicating position every sector of lower denomination than any one of the numeral bearing members brought to a numeral registering position.

4. A calculating machine including several denominational orders of registering means including numeral bearing elements, comprising means for actuating the numeral bearing elements, each said numeral bearing element having an aperture therein, an indicator device cooperating with said aperture, and means for actuating said indicator devices to provide a visual indication in all denominational orders lower than that in which a said numeral bearing element has been actuated.

5. The combination of a register including several denominational orders of numeral wheels provided with numerical indicia, each said numeral wheel having an aperture therein, with means for actuating said numeral wheels, an indicator device associated with each said numeral wheel and having an indicia blanking position and an indicia indicating position relative to the said aperture in the associated numeral wheel, means operable upon actuation of a said numeral wheel for operating the said indicator device in the actuated denominational order to indicating position, and means responsive to the operation of the said indicator device for operating to indicating positions the indicator devices in all lower denominational orders visually to indicate any ciphers in said lower orders, the numerical indicia of the denominational orders higher than the one actuated remaining invisible.

6. In a calculator including denominational orders of wheels for registering the ordinal numerals of 1 to 9, inclusive, each said wheel having an aperture therein at the position normally occupied by a cipher, means for visually distinguishing between every denominational order not to be read as a part of any registered result and every other denominational order of the calculator, comprising a significant-digit indicator operating internally of each said wheel and having a blanking position and a cipher indicating position for variably registering through the aperture in the corresponding wheel a blank when said significant-digit indicator is at blanking position and a cipher when it is in cipher indicating postion, and means for governing the variations of registering by the significant-digit indicators.

7. In a calculator, an accumulator comprising several denominational orders of numeral wheels, each bearing the numerals 1 to 9, inclusive, and having an aperture therein at the position normally occupied by a cipher, devices for clearing said accumulator to register the apertures of all of said numeral wheels, inner sectors associated with each of said numeral wheels and having a blank position and a cipher indicium registering position relative to the aperture in each of said wheels when said aperture is in registering position, means operated by said clearing devices for causing said inner sectors to be aligned in blanking position relative to said apertures, and means for causing, when an amount is added to any denominational order of the accumulator, the sectors in that order and all lower denominational orders to be moved to cipher indicia registering position relative to the apertures in said numeral wheels.

8. In a calculator, an accumulator comprising several denominational orders of numeral wheels, each bearing the numerals 1 to 9, inclusive, and having an aperture therein at the position normally occupied by a cipher, devices for clearing said accumulator to register the apertures of all of said numeral wheels, inner sectors, each having a blank position and a cipher indicium registering position relative to the aperture in one of said wheels when said aperture is in registering position, and means operated by said clearing devices for causing alignment of all of said apertures and movement of all of said inner sectors to blank position relative to said apertures.

9. In a calculating machine, a register having several denomiinational orders of numeral wheels provided with numerical indicia and having apertures at the positions normally occupied by ciphers, devices cooperating with said apertures to register ciphers, means for actuating said register in calculation, means for clearing said register, said devices cooperating with said clearing means to render said numerical indicia and said ciphers invisible when said register is cleared, and said devices being operable in response to operation of said actuating means to render visible a cipher in every order of lower denomination than an actuated order as an indication that all of said orders are to be read as part of the result of said calculation, the said numerical indicia and said cipher remaining invisible in all orders of higher denomination than that actuated.

FREDERICK A. NIEMANN.

CERTIFICATE OF CORRECTION.

Patent No. 2,346,601.  April 11, 1944.

FREDERICK A. NIEMANN.

It is hereby certified that error appears in the printed specification of the above numbered patent requiring correction as follows: Page 2, second column, line 17, for "movement of" read --movement on--; page 7, second column, line 10, claim 9, for "denomiinational" read --denominational--; and that the said Letters Patent should be read with this correction therein that the same may conform to the record of the case in the Patent Office.

Signed and sealed this 1st day of August, A. D. 1944.

(Seal)

Leslie Frazer
Acting Commissioner of Patents.